United States Patent [19]

Valley

[11] 4,179,950

[45] Dec. 25, 1979

[54] STEERING WHEEL COVER

[76] Inventor: James F. Valley, 6613 Hollis St., Emeryville, Calif. 94608

[21] Appl. No.: 911,205

[22] Filed: May 31, 1978

[51] Int. Cl.$^2$ .......................... G05G 1/10; B65H 81/00
[52] U.S. Cl. ..................................... 74/558; 150/52 M
[58] Field of Search ............................. 74/558, 558.5; 150/52 M

[56] References Cited

U.S. PATENT DOCUMENTS

| | | | |
|---|---|---|---|
| 1,538,147 | 5/1925 | Trench et al. | 74/558 |
| 1,997,738 | 4/1935 | Maxedon et al. | 74/558 X |
| 2,058,740 | 10/1936 | Summers | 74/558 |
| 2,078,059 | 4/1937 | Churchill | 74/558 |
| 2,157,950 | 5/1939 | Best | 74/558 |
| 2,226,866 | 12/1940 | Lipschultz | 74/558 |
| 2,309,374 | 1/1943 | Alexander | 74/558 |
| 2,491,803 | 12/1949 | De Heras et al. | 74/558 |

FOREIGN PATENT DOCUMENTS 516269 12/1939 United Kingdom ...................... 74/558

OTHER PUBLICATIONS

Advertisement in "Autocar" magazine, vol. 121, p. 5, Dec. 18, 1964.

Primary Examiner—Samuel Scott
Assistant Examiner—Daniel J. O'Connor
Attorney, Agent, or Firm—Warren, Chickering & Grunewald

[57] ABSTRACT

A steering wheel cover comprising an annular band of soft, flexible material having a length dimensioned for distension around a steering wheel rim and a width dimensioned for wrapping around said rim, juxtaposing opposite side edges of the band. The band is formed with hems at and extending longitudinally of the side edges and is perforated for interlacing the side edges. A flexible cord is mounted in and extends longitudinally of each of the hems between the perforations and the side edges. The cords and perforations are positioned for and the cords have tensile strength requisite for transmitting to the side edges the clamping action of the interlacing while relieving stress on the walls of the perforations.

7 Claims, 5 Drawing Figures

STEERING WHEEL COVER

BACKGROUND OF THE INVENTION

1. Field of Invention

The invention relates to covers for steering wheels and also to hand wheels of any type having a shape similar to steering wheels upon which a cover may be desired.

2. Description of Prior Art

It has long been recognized that the addition of a cover to a hard-surfaced steering wheel offers improved grip and increased comfort to the driver. Accordingly, the prior art discloses a number of different steering wheel covers. The covers disclosed in the prior art generally fall into one of the following two categories: (1) covers which are held in place by elastic or adhesive means, and (2) covers which are held in place by lacing.

The most common design for the lace-on type of cover has perforations along the edges of the cover for the purpose of interlacing and pulling the two edges toward each other. A problem common to prior art lace-on covers is tearing at the perforations. This tearing is caused by failure of the walls of the perforations due to excessive strain imposed by the lacing. Since a snug fit is dependent upon tight lacing, durability must be sacrificed if a proper fit is to be had. Certain prior art lace-on cover designs have attempted to alleviate the tearing problem by wrapping a continuous length of lace around the outside of the cover in a helical fashion. This outside helical wrapping keeps the cover from slipping and thus eliminates the need for interlacing between the edges. The outside helical wrap-around lacing, however, interferes with the otherwise smooth gripping surface of the cover material.

The covers disclosed in the prior art are all distinguishable from the instant invention in that none discloses or even suggests the use of a flexible cord mounted within the hems which, when the edges are interlaced, serves the dual function of tensioning the cover and relieving stress on the walls of the perforations.

SUMMARY OF THE INVENTION

An object of the present invention is to provide a snug fitting steering wheel cover having the following features:

(a) edges which may be interlaced under extremely high tension without tearing or other structural failure;

(b) a smooth, gripping surface unbroken by lacing which wraps around the rim on the outside of the cover; and (c) the cover material is kept under constant tension, thereby resisting slippage and bunching and preventing loosening of the fit with the passage of time.

The present invention is a steering wheel cover having the form of an annular band of soft, flexible material. The band has a length dimensioned for distension around a steering wheel rim and a width dimensioned for wrapping around the rim, juxtaposing the side edges of the band. The cover is held in place by interlacing the juxtaposed opposite side edges and pulling them toward each other under high tension. Once installed, the cover is subjected to permanent tensioning which causes the material to conform to the contours of the rim surface and prevents slipping. The cover is easily installed, requiring no special tools other than a lacing needle. Its removal is equally simple. The edges of the cover may be interlaced under high tension without tearing, ripping, or otherwise causing failure in the material through which the lacing passes. Since the tearing problem is eliminated, durability need not be sacrificed in order to insure a tight fit. The ability of the cover to withstand high tension in its interlacing allows a tightly contoured fit heretofore unobtainable in lace-on steering wheel covers.

The present invention, by simultaneously solving the tearing problem and eliminating the need for lacing which wraps around the rim on the outside of the cover, elegantly solves a problem which has previously eluded solution. The flexible cord contained within the hems of the cover provides, when the edges are interlaced, a uniform tensioning of the cover material in a manner which is not obtained by localized reinforcement of the perforations, such as eyelets.

The invention possesses other objects and features of advantage, some of which of the foregoing will be set forth in the following description of the preferred form of the invention which is in the drawing accompanying and forming part of this specification. It is to be understood, however, that variations in the showing made by the said drawing and description may be adopted within the scope of the invention as set forth in the claims.

DETAILED DESCRIPTION OF THE INVENTION

Figure 1:
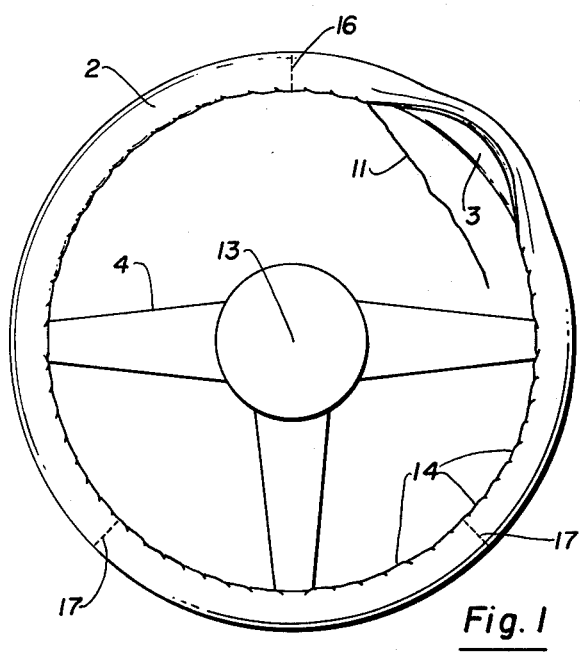
FIG. 1 is a front elevation of a steering wheel having a cover embodying the present invention partially installed on the rim.

The steering wheel cover of the present invention comprises, briefly, an annular band 2 of soft, flexible material having a length dimensioned for distension around the rim 3 of a steering wheel 4 and a width dimensioned for wrapping around the rim, juxtaposing opposite side edges 5 and 6 of the band; the band 2 being formed with hems 7 and 8 at, and extending longitudinally of, the side edges 5 and 6 and having perforations 9 for interlacing the side edges; and a flexible cord 10 mounted in, and extending longitudinally of each of the hems between the perforations 9 and the side edges 5 and 6, the cords 10 and perforations 9 being positioned for and the cords having tensile strength requisite for transmitting to the side edges 5 and 6 the clamping action of the interlacing 11, while relieving stress on the walls 12 of the perforations 9.

Figure 5:
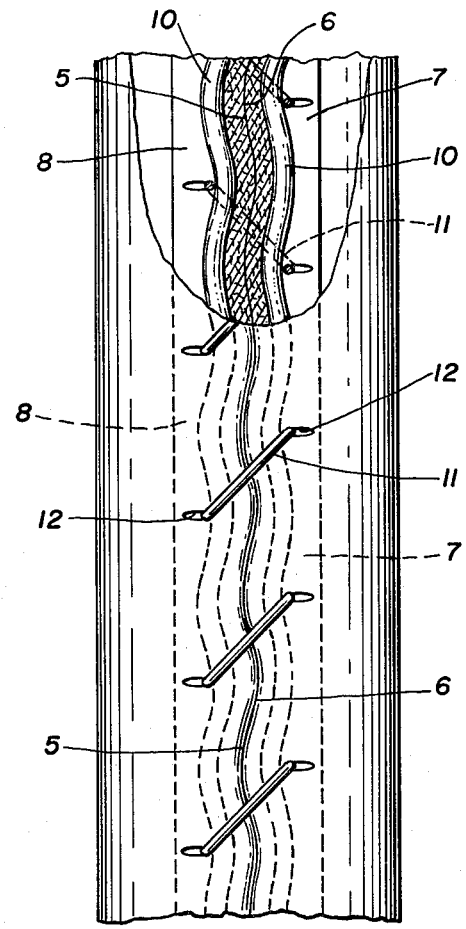
FIG. 5 is an enlarged elevational view partially in section of a laced portion of the installed cover.

In the preferred form, the flexible cord 10 has an endless circular form of a length slightly less than the internal periphery of the rim 3, upon which the band 2 is to be mounted. This assures that, when the edges 5 and 6 are interlaced, the cords 10 will be tensioned, thus simultaneously pulling the two edges towards each other, and the material of the band 2 will be tightly pulled towards the center 13 of the wheel 4. The pulling action towards the center is evidenced by the series of circumferentially spaced bulges 14, which peak between the perforations 9 and point towards the center 13. As seen in FIG. 5, the cord 10 is located so as to relieve stress on the walls of the perforations 9 caused by the lacing 11.

Figure 2:
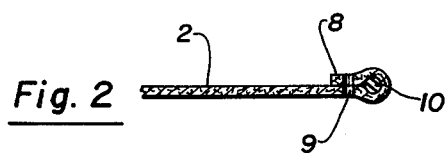
FIG. 2 is a fragmentary cross-sectional view on an enlarged scale, taken substantially on the plane of line 2—2 of FIG. 3.
Figure 3:
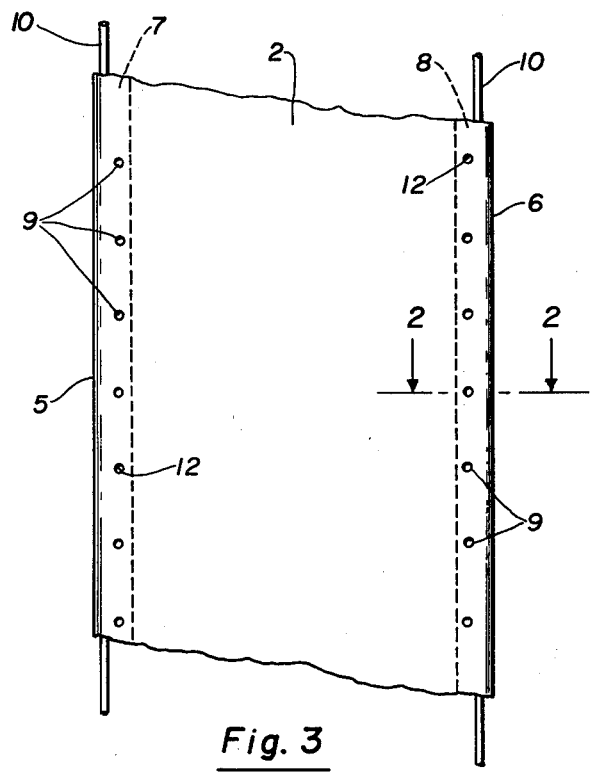
FIG. 3 is a front elevational view of a portion of the cover.

As seen in FIG. 2, the hem 8 is formed by folding a portion of the band material over upon itself and fastening the abutting faces together. In the preferred form of the invention, adhesive fastening means are used on the hems, although sewing produces equally satisfactory results. It has been found that top grain leather provides the most satisfactory material for the band in terms of grip characteristics and appearance. Other soft, flexible materials, such as plastic, rubber, and certain fabrics, could be used. Various plastic materials will furnish adequate flexibility and tensile strength for use as the cord 10. It has been found that nylon, in either the stranded or monofilament form, offers satisfactory results.

Figure 4:
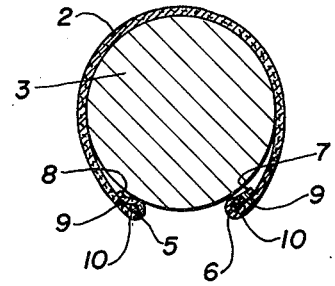
FIG. 4 is a cross-sectional view of the cover on a steering wheel rim prior to lacing.

In the preferred form of the invention, the steering wheel cover, prior to installation, is in the form of an endless band. This band is stretched onto the rim of the steering wheel and positioned so that the edges 5 and 6 are juxtaposed on the inside perimeter of the rim 3. Installation consists of interlacing the juxtaposed edges using lace 11. When the lace is pulled tight, the juxtaposed edges 5 and 6 are pulled together, as shown in FIG. 5. It has been found that nylon stranded cord serves as a satisfactory lacing material. The appearance of the cover before lacing is shown in FIG. 4, as well as in the approximate two o'clock position on the rim of the steering wheel, shown in FIG. 1. When the lace-up is completed, the ends of the lacing may be fastened together by means of a knot or other means.

The relative location of the cord 10 in relation to the series of longitudinal perforations 9 and the edges of the band is quite important. The cord 10 must be positioned between the perforations and the edge so that, when the edges are interlaced, the cord 10 will be tensioned and will also relieve stress on the walls 12 of the perforations 9. If the perforations are located too far away from the edge of the band, the perforations will tear when the lace 11 is pulled tight. In FIG. 5, the tension of the interlacing cord 11 has elongated the perforations 9, but tearing is prevented by the cords 10, which are under tension. The sinusoidal path of the tensioned cords 10, as seen in FIG. 5, show how the clamping action of the interlacing cord 11 is transmitted uniformly to the side edges 5 and 6. The edges are seen in FIG. 5 to follow the exact contour of the tensioned cords 10, providing uniform abutment.

The cords 10 allow the construction of a cover whose edges 5 and 6 may be interlaced under tension which would cause material failure in other steering wheel cover designs. This high tension interlacing eliminates the need for outside helical wrap-around lacing with its attendant functional and aesthetic disadvantages. The present invention offers the driver an unimpaired gripping surface which is comfortable, slip-resistant, and aesthetically pleasing.

Band 2 is preferably composed of a one-piece, continuous leather strip sewn together at its opposite ends, as indicated at 16 in FIG. 1, to provide an endless circle. It is quite feasible, however, to construct the band from a plurality of shorter lengths which are joined, as by sewing, as indicated at 17 on FIG. 1. Also, as desired, a lining of flexible foam material may be included interiorly of the band to provide a soft, compressive mounting thereof on the steering wheel rim 3.

What is claimed is:

1. A steering wheel cover comprising:
   an annular band of soft flexible material having a length dimensioned for distension around a steering wheel rim and a width dimensioned for wrapping around said rim juxtaposing opposite side edges of said band;
   said band being formed with hems at and extending longitudinally of said side edges and being perforated to provide means for interlacing said side edges; and
   a nonelastic flexible cord mounted in and extending longitudinally of each of said hems between said perforations and said side edges, said cords and perforations being positioned for, and said cords having tensile strength requisite to thereby provide means for transmitting to said side edges the clamping action of said interlacing while relieving stress on the walls of said perforations, whereby, when said steering wheel cover is laced on a steering wheel through said perforations the force of stretching said cover is transmitted to said cords and tearing of said perforations is avoided.

2. The structure of claim 1, said flexible cord having an endless circular form of a length less than the internal periphery of said rim.

3. The structure of claim 1, wherein said flexible cord is composed of a plastic material.

4. The structure of claim 1, wherein said soft flexible material is leather.

5. The structure of claim 3, wherein said plastic material is nylon.

6. The structure of claim 1, wherein said annular band is lined with flexible foam.

7. The structure of claim 1, wherein said annular band is formed by fastening together segments of said soft flexible material.

* * * * *